Jan. 23, 1968  R. CRIBLEZ  3,364,721
ARRANGEMENT FOR CONTROLLING THE MOVEMENT OF AN AUXILIARY
ELEMENT ON A CRANK-OPERATED DEVICE
Filed April 7, 1965  3 Sheets-Sheet 1

INVENTOR
ROGER CRIBLEZ

BY *Wenderoth, Lind & Ponack*
ATTORNEYS

Jan. 23, 1968 R. CRIBLEZ 3,364,721
ARRANGEMENT FOR CONTROLLING THE MOVEMENT OF AN AUXILIARY
ELEMENT ON A CRANK-OPERATED DEVICE
Filed April 7, 1965 3 Sheets-Sheet 2

INVENTOR
ROGER CRIBLEZ

BY *Wenderoth, Lind & Ponack*
ATTORNEYS

Jan. 23, 1968   R. CRIBLEZ   3,364,721
ARRANGEMENT FOR CONTROLLING THE MOVEMENT OF AN AUXILIARY
ELEMENT ON A CRANK-OPERATED DEVICE
Filed April 7, 1965   3 Sheets-Sheet 3

INVENTOR
ROGER CRIBLEZ

BY *Wenderoth, Lind & Ponack*

ATTORNEYS

United States Patent Office 3,364,721
Patented Jan. 23, 1968

3,364,721
ARRANGEMENT FOR CONTROLLING THE MOVEMENT OF AN AUXILIARY ELEMENT ON A CRANK-OPERATED DEVICE
Roger Criblez, Bottmingen, near Basel, Switzerland, assignor to F. B. Hatebur, Basel, Switzerland, a Swiss firm
Filed Apr. 7, 1965, Ser. No. 446,266
Claims priority, application Germany, Apr. 10, 1964, H 52,316
5 Claims. (Cl. 72—345)

ABSTRACT OF THE DISCLOSURE

An arrangement for controlling the movement of an auxiliary element on a crank-operated device, such auxiliary element being, for example, a press tool ejector pin, wherein the amount and time duration of each movement of the element are adjustable, which arrangement includes a first control element having a cam surface and being pivotably attached to the device, an actuating element attached to the crank, a connecting member pivotably connected at one point to the actuating element and pivotably connected at another point to said control element, whereby the control element is operated by movement of the crank, and a second control element pivotably attached to the device and operable by the movement of the cam surface of the said first control element to control the movement of the auxiliary element.

---

The present invention relates to an arrangement for controlling the movement of an auxiliary element on a crank-operated device and it has particular, though not exclusive, application to presses where such auxiliary elements are, for example, press slide ejectors and press die guide bushes; the movement with respect to time characteristic and the particular movements of which are adjustable.

It is known, in press slides which are reciprocated by means of a crank drive, to control the movement of auxiliary elements which are disposed on the press slide and which reciprocate therewith, for example in the form of a press slide ejector for the ejection of the pressed object from a press die, by means of a locally stationary control shoe. The time of commencement of the control effect may be adjusted by a displacement of the control shoe in its retaining arrangement.

The disadvantage of a design of this kind consists in that the auxiliary elements are, during the forward and return stroke of the slide, actuated in each case at the same point of the stroke and a control movement can be transmitted only during the movement of the slide. In practice, however, it may be expedient to require the auxiliary elements to be controlled in their movement when the movement of the slide is small or equal to zero.

It is an object of the present invention to provide a device wherein the control of the movement of an auxiliary element disposed on a crank-operated device may be given, comparatively easily, a different movement characteristic, with if desired a different time interval for the movement with a required time relationship between the movement of the auxiliary element and the movement of the device.

According to the present invention there is provided an arrangement for controlling the movement of an auxiliary element on a crank-operated device, such auxiliary element being, for example, a press tool ejector pin, wherein the amount and time duration of each movement of the element are adjustable, which arrangement includes a first control element having a cam surface and being pivotably attached to the device, an actuating element attached to the crank, a connecting member pivotably connected at one point to the actuating element and pivotably connected at another point to the said control element, whereby the control element is operated by movement of the crank, and a second control element pivotably attached to the device and operable by the movement of the cam surface of the said first control element to control the movement of the auxiliary element.

Embodiments of the invention together with a known arrangement will now be described with reference to the accompanying drawings, in which.

Figure 4:
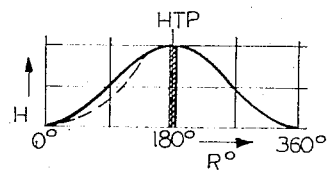
Figure 3:
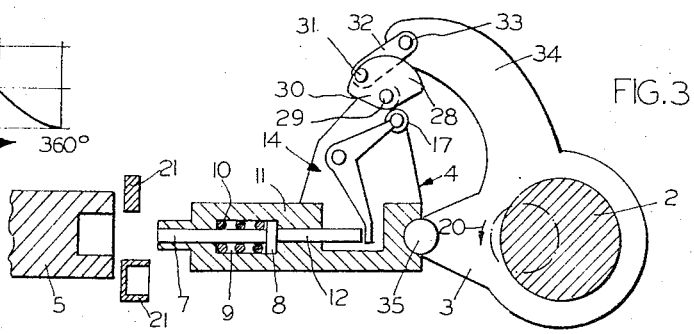
Figure 6:
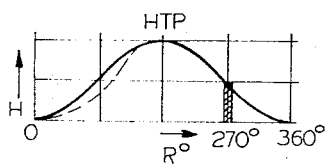
Figure 5:
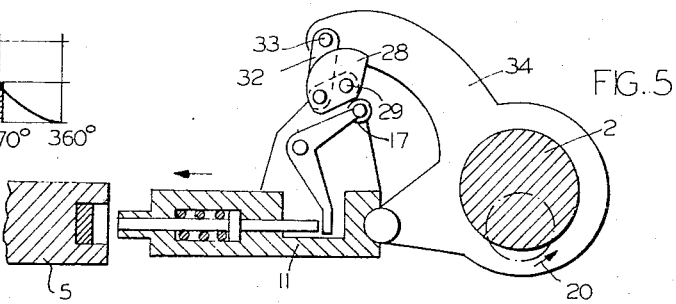
Figure 8:
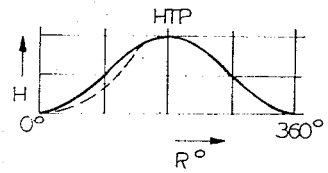
Figure 7:
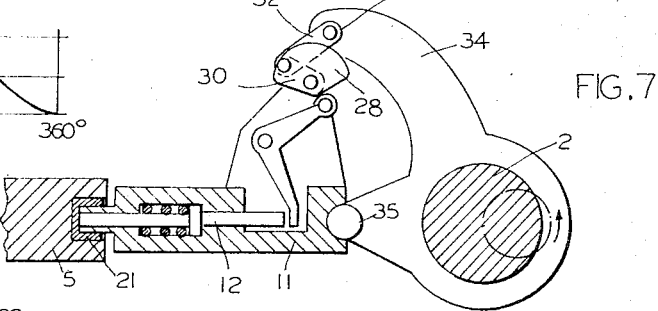
Figure 10:
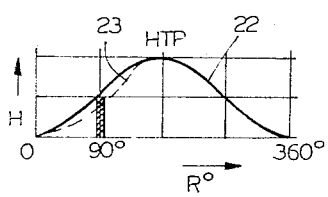
Figure 9:
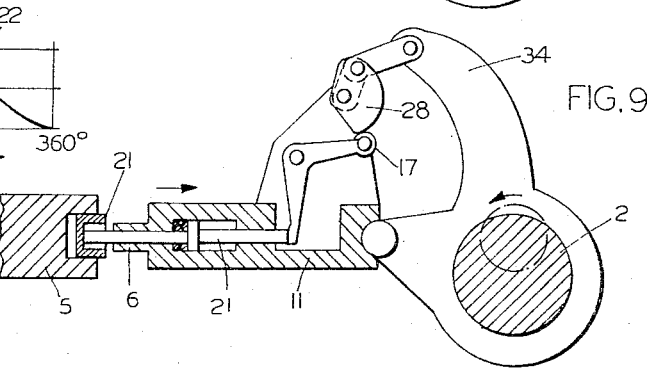
Figure 12:
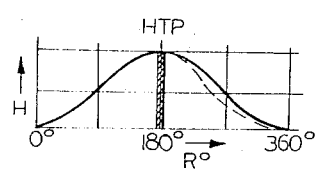
Figure 11:
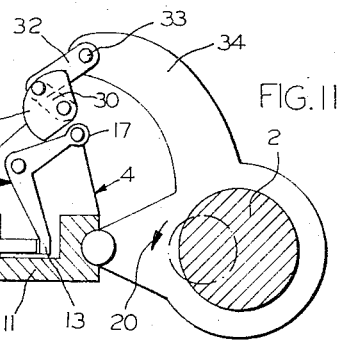
Figure 14:
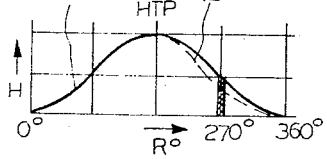
Figure 13:
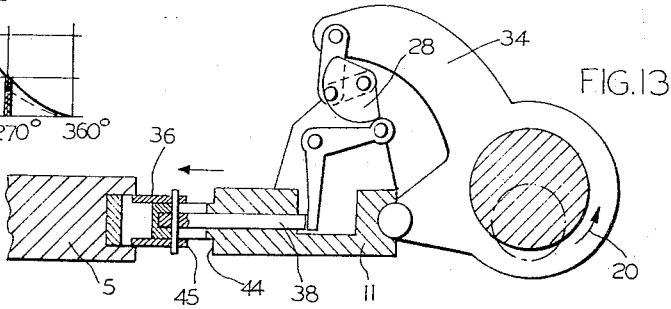
Figure 16:
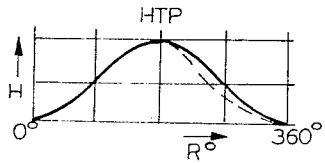
Figure 15:
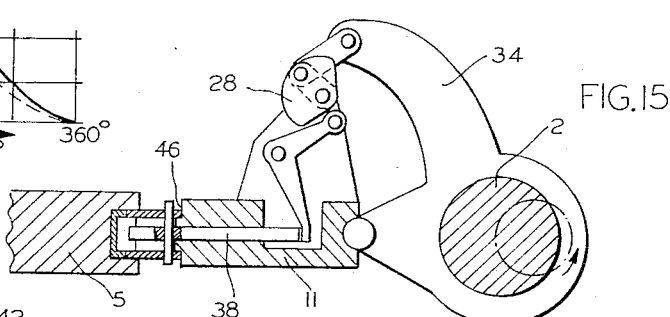
Figure 18:
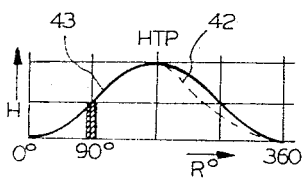
Figure 17:
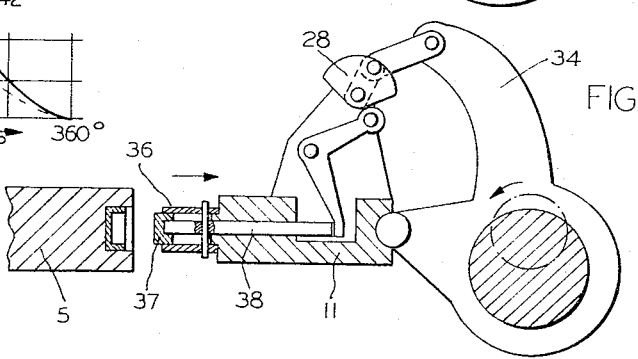

FIGURE 3 shows, in diagrammatic form and in elevation, the main parts of a press having a crank drive and an ejector arranged in a press slide, the movement of which is controlled by means of an oscillating cam disc control element, the control being required to take place during the return stroke of the press slide, the illustration showing the position of the press slide at the bottom dead centre before the commencement of the working stroke;

FIGURE 4 shows the time-path diagram for the crank and ejector of the press according to FIGURE 3, with marking of the instant of time corresponding to a 180° crank rotation or the commencement of a crank revolution;

FIGURES 5, 7 and 9 show the press according to FIGURE 3, with the positions of the individual parts of 270°, 360° or 90° rotation of the crank;

FIGURES 6, 8 and 10 show time-path diagrams according to FIGURE 4, with an indication of the position for the crank and the ejector at 270°, 360° or 90° of rotation;

FIGURE 11 shows, diagrammatically and in elevation, the basic press according to FIGURE 3; but instead of an ejector there is shown a guide bush the relative displacement of which is required to take place during the advance of the press slide and the control arrangement is basically the same as that shown in FIGURE 3, although the oscillating cam disc control element is secured in a different relative position;

FIGURE 12 is the time-path diagram for the crank and guide sleeve in the press according to FIGURE 11, with marking of the position of the instant of time corresponding to 180° rotation of the crank position or commencement of a crank revolution;

FIGURES 13, 15 and 17 show the press according to FIGURE 11 with the positions of the individual parts at 270°, 360° or 90° rotation of the crank; and FIGURES 14, 16 and 18 are time-path diagrams according to FIGURE 12 with indication of the positions for the crank and guide bush at 270°, 360° or 90° of rotation.

Figure 19:
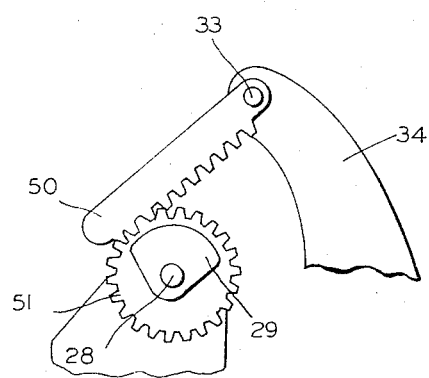

FIG. 19 shows a modified means for controlling the cam element.

Figure 1:
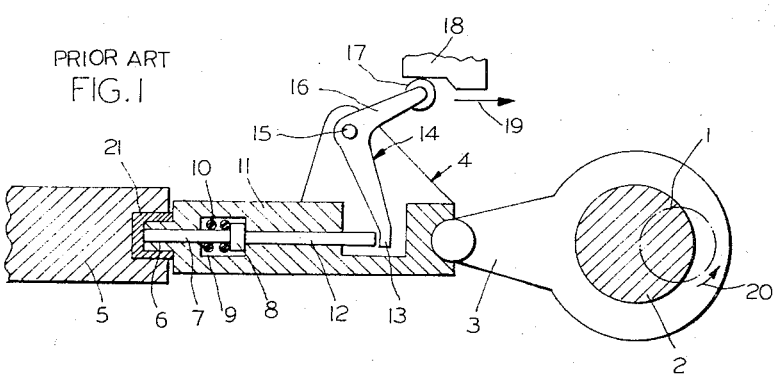
FIGURE 1 shows, in diagrammatic form, an elevation of the main parts of a press having a press slide which is reciprocated by means of a crank and is shown, in FIGURE 1, in the top dead centre position at the end of the pressing step, and a press slide ejector the movement of which is controlled by means of a known cam shoe.

FIGURE 1 shows a press having a hitherto-known locally stationary control shoe for the control of a press slide ejector. Referring to FIGURE 1, reference numeral 1 shows the locas of the centre point of a crank pin 2. A connecting rod 3 and a slide superstructure 4 are reciprocated by the crank. A part of a press frame 5 forming the lower press die is shown, while at 6 an upper press die is shown which is in one piece with a press slide body 11. An ejector pin 7 is shown forming a part of the upper or male press die 6, and having a head-shaped end 8. At 9 there is shown a recess in the slide body 11 for receiving the pin head 8, and at 10 a spring normally retaining the head 8 in the position illustrated in the figure. The press slide body 11 carries in a longitudinal bore an ejection rod 12 against one end of which one of the lever arms 13 of a bell crank 14 bears. The bell crank 14 is mounted by its pivot 15 on the slide superstructure 4. The end of the second lever arm 16 of the bell crank 14 bears, through a roller 17 against a cam on a control shoe 18. The control shoe is adjustable when the machine is set up, so that the time of commencement of the control effect can be varied to a certain extent. During the operation of the machine the control shoe is not adjusted.

The roller 17 moves out of the position shown in FIGURE 1, in the direction of the arrow 19, when the crank shaft 2 moves so that its centre rotates in the direction of the arrow 20 to a point immediately opposite that at which it is shown. As this take place, the slide 11 is drawn away from the female die 5. As soon as the roller 17 rolls up the oblique or transition member of the control shoe 18, the bell crank 14 is rotated. The free end of the lever arm 13 is, meanwhile, pressed against the ejector rod 12 and displace the ejector pin 7, via the rod, against the pressure under which the spring 10 bears against the pin head 8.

Consequently, the forward end of the ejector pin 7 emerges out of the male press die 6 as it is withdrawn from the female die. At the same time, the pin 7 pushes a pressing blank 21 adhering to the male press die away from the male press die.

Figure 2:
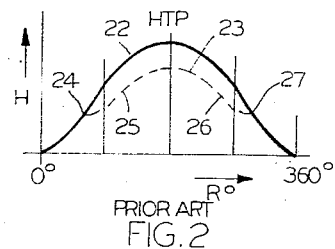
FIGURE 2 shows a time-path diagram indicating the stroke of the press slide and ejector of FIGURE 1 and their relative position, as a function of the angle of rotation of the crank.

FIGURE 2 shows, in a time-path diagram by means of the curve 22 the stroke H of the press slide out of the position shown in FIGURE 1, as a function of the angular position R° of the crank shaft. If the position of the crank shaft shown in FIGURE 1 is assumed to be the position corresponding to zero angle and zero stroke, then, it may be seen that, on further rotation of the crank shaft, the stroke of the press slide 11 increases up to the height H at a rotation of 180° (top dead centre) and that from 180° it decreases to 360°. The dotted curve 23 shows the stroke development of the ejector. Its maximum stroke is, relative to the position shown in FIGURE 1, smaller than the stroke of the press slide; initially, it moves with the press slide but it begins to move more slowly than the press slide at the point 24, so that a relative movement is set up between the ejector and the press slide. The relative movement between these two elements is continued only until point 25 of the curve 23 is reached. During this time, the roller 17 has travelled over the transition portion of the control shoe. A relative movement in the opposite sense then takes place during the time between the point 26 on the curve 23 and the point 27 on the curve 22. During this time, the roller 17 travels back in the opposite direction over the transition portion of the control shoe 18.

The points 24 and 27 are disposed symmetrically with respect to the apex of the curve 22. They can, by shifting the control shoe in FIGURE 1 towards the right in the curve 22, be shifted nearer to the apex and, by displacement of the control shoe in FIGURE 1 towards the left, be shifted further away from the apex of the curve 22. Nevertheless, the position of the points 24 and 27, wherein the relative movement of the controlled ejector commences or terminates, remains symmetrical with respect to the dead centres of the press slide movements which are here in the vicinity of 0° and 180° crank rotation.

Since the control effect of the control shoe is produced by the movement of the press slide, the control shoe cannot transmit any control effect in the dead centre of the press slide movement and can only transmit a small control effect near the dead centre.

In the device which is now to be described, the control effect is independent of the position of the superstructure which carries an auxiliary element requiring to be controlled and is moved by a crank.

FIGURE 3 shows an embodiment of the novel device. The press according to FIGURE 3 differs from the press shown in FIGURE 1 in that, instead of the stationary control shoe 18, an oscillating cam 28 is provided on the superstructure and the beak-like projection 34 is provided on the connecting rod 3. The oscillating cam and the projection are connected together via control elements 30, 32 and the connecting elements adjusting the oscillating cam in dependence on the position of the projection.

Also in the case of the following embodiment, the commencing or initial position selected, in order that the invention may be more readily understood, is the dead centre position of the advanced press slide after the pressing or working stroke and the position of the crank shaft is said to have an angle of rotation of 0° in this position. This position is shown in FIGURE 7.

The oscillating cam 28 is pivotally mounted on the superstructure 4 by means of a pivot 29. On the same pivot there is also one end of a strap 30, the other end of which is pivotally connected, by means of a pin 31, with one end of a further strap 32. The oscillating cam 28 and the strap 30 are arranged on the pivot 29 so that they are not rotatable with respect to one another. The other end of the strap 32 is pivotally secured by means of a pin 33 on the projection 34 disposed on the connecting rod 3.

The mode of operation of the arrangement according to FIGURE 3 is as follows:

From the position illustrated in FIGURE 3, the centre point of the crank shaft rotates in the direction of the arrow 20. As this is done, the crank 2 is moved from the central position, as illustrated in FIGURE 3, so that the pin 33, at the free end of the projection 34, moves on an arc of a circle the centre point of which is located at the centre of the pivot 35 of the bearing of the connecting rod 3 on the press slide 11 and the radius of which is equal to the spacing between the centre of pivot 35 and the centre of the pin 33. The movement of the pin 33 is counter-clockwise about the rotation centre provided by the pivot 35.

Simultaneously, however, also the press slide is moved out of its bottom dead centre (B.D.C.) position in the direction towards the female die.

After the rotation of the crank shaft through 90°, the press slide, the crank drive and the control device are, with the oscillating cam 28, in the position illustrated in FIGURE 5, i.e. the press slide has advanced by the amount of half of its stroke and the oscillating cam 28 has been rotated about its axis counter-clockwise, through the action of the strap 32 attached to the pin 33 which travels towards the left on a portion of an arc of a circle, as referred to in the description of FIGURE 3. The roller 17 meanwhile moves on the portion of the oscillating cam which corresponds to a portion of an arc of a circle having the smallest radius of the oscillating cam curve. This means that the bell crank 14 and the ejector rod 12 have not been moved during this quarter revolution. The press slide 11 and the ejector rod 12 were moved a quarter of the stroke of the press slide but there was no relative movement between them.

In the path-time diagram of FIGURES 4 and 6, the position of the press in FIGURE 3 corresponds to the point 180° in FIGURE 4 and the position of the press in FIGURE 5 corresponds to the point at R°=270° in FIGURE 6. No relative movement took place between the press slide and the ejector over the 90° of the crank which occurred during the movement from the position shown in FIGURE 3 to that shown in FIGURE 5, so that here the movement curves of both overlap.

On further rotation of the crank shaft from the position illustrated in FIGURE 5, in the direction of rotation of the arrow 20, after a rotation through a further 90°, the position shown in FIGURE 7 is attained. The projection 34 on the connecting rod 3 has, during this quarter rotation, moved in such manner that the pin 33 has travelled clockwise about its pivoting centre 35. At the same time, the press slide 4 has moved further by the amount of a half a stroke and the relative movement of the pin 33 to the pivot 29 of the oscillating cam 28 has produced, through the action of the straps 30, 32, the result that the oscillating cam 28 has again returned to the position shown in FIGURE 3. The roller 17, however, has not left the cam portion on the oscillating cam forming the arc of a circle with the smallest radius. FIGURE 7 shows, therefore, an unadjusted ejector rod 12 and FIGURE 8 shows, at the point for 360° or 0° of crank rotation in the time-path diagram of FIGURE 8, no relative displacement between the press slide and the ejector.

FIGURE 11 shows the press slide at its top dead centre (T.D.C.) with the finally pressed blank 21.

A comparison between FIGURE 7 after the crank rotation of 180° and FIGURE 9 after the 270° crank rotation shows clearly what takes place in the third quarter of the rotation of the crank shaft. The press slide is withdrawn by half a stroke out of its top dead centre position near the female die and the projection 34 carries the pin 33 back to such an extent, and the oscillating cam is rotated clockwise through the action of the straps 30, 32 to such an extent, that the cam portion with the largest radius of the oscillating cam 28 passes into abutment against the roller 17. Consequently, the bell crank 14 is pivoted clockwise and the ejector is actuated in such a manner that the pressed blank 21 is ejected from the male press die 6.

FIGURE 10 shows, correspondingly, at the point for 270° of rotation of the crank, a spacing between the curve 22 for the slide position and the curve 23 for the ejector position. Moving away from the position for 180° of rotation of the crank, the movement of the ejector rod 12 commences. The ejector rod (as curve 23 shows) travels from the left towards the right in FIGURE 9, in a delayed manner relatively to the press slide 4 and consequently causes the pin 7 to project progressively out of the male press die until, at 270° of rotation of the crank, a maximum of the spacing between the curve 22 and the curve 23 is attained and the pressed blank 21 is pressed from the male press die.

In the last quarter of the crank shaft rotation, the transition takes place from the position of FIGURE 9 corresponding to 270° of rotation of the crank into the position according to 360° of rotation of the crank, which latter position corresponds to that shown in FIGURE 3 for a rotation of 0° of the crank. The oscillating cam 28 travels meanwhile back into the position shown in FIGURE 3 and the ejector rod 12 again returns into its starting position, so that the spring 10 is able to press the pin 7 back into its starting position.

Referring to FIGURE 10, in the last quarter of the time-path diagram, the curve 23 again merges into the curve 22. Thus, in this zone, the relative movement of the ejector is so rapid that the ejector reaches the end of its movement before the press slide has reached the bottom dead centre.

The above discussion of the device shows clearly that the movement of the ejector is varied by the selection of the shape of the control curve on the oscillating cam and is released from the dependency, which had hitherto existed, on the movement of the press slide.

If, for example, in FIGURE 9, the oscillating cam is designed, not with the curve portion shown in full lines, against which the roller 17 bears, but with the curve portion shown in broken lines, the pressed blank is discharged from the male press die considerably later.

A comparison between the time-path diagram of FIGURE 2 and that of FIGURE 10 shows the advantage of the new device for controlling the movement of the ejector, since the ejector does not require to be put in an operative position in advance and is not dependent on the movement of the press slide, but it requires to be adjusted for the fulfilment of these tasks only during the interval during which it is required to fulfil its task, its movement being controlled during this time. Thus, the development of the movement can be as desired, i.e. it may be prolonged or shortened in any desired component and it may develop in such way as to be produced more rapidly or more slowly.

Finally, the commencement of a control function determined in any desired manner, relatively to the press slide movement, may be temporally selected at will, with a device according to the invention. In support of this contention, the control of a guide bush will now be described.

FIGURE 11 shows, fundamentally, the same superstructure as in FIGURE 3, with the following differences:

The auxiliary element to be controlled is not an ejector but a guide bush 36 which surrounds the male press die 37 and requires to be moved in such manner that it enters the female die 5 before the male die, and forms a guide for the male press die during its entry into the female die. The bush, together with the male press die limits the space left in the female die for the pressed blank to the shape which the finished pressed blank 21 is to assume, and is withdrawn when the male press die is withdrawn from the female die.

The slide 4 has, as in FIGURE 3, a longitudinal bore which terminates blind in the male press die 37, before reaching the end face. The bore receives a single rod 38 having at its front end located in the male press die a bore extending transversely through the rod and serving for receiving a pin 39. The pin 39 extends through two slots 40, 41 which connect, in the male die, the longitudinal bore for the rod 38 with the outside of the male die 37 and extend, flush with each other, in the longitudinal direction of the longitudinal bore. The ends of the pin 39 engage in the guide bush 36, so that the latter is connected with the rod 38 in such manner as to be rigid in displacement with a rod 38.

The slots 40, 41 are made as long as is desirable for the required displacement of the guide bush 36 in the longitudinal direction of the male press die 37 and the rod 38 is, as seen to the left of the pin 39 in FIGURE 11, sufficiently short to permit the desired maximum displacement of the guide sleeve before the male die.

The actuation of the rod 38 is effected, as in FIGURE 3, by the bell crank 14 the movement of which is brought about by an oscillating cam 28 whose movement is controlled via the straps 30, 32 by the projection 34 on the connecting rod 3.

As in the case of FIGURE 3, there is provided for the pin 7 a return guiding means wherein the pin 7 and the ejector rod 12 are pressed back into the unactuated position by means of a spring 10 which is arranged in a recess in the slide and which bears against the head 8 of the pin; in this case also it is necessary to provide for the return of the rod 38 into its position shown in FIGURE 11, but this provision is not illustrated, in view of the embodiment illustrated in FIGURES 1 and 3.

A comparison between FIGURES 3 and 11 shows clearly that the oscillating cam 28 in FIGURE 11 is the same as in FIGURE 3 but that the position thereof in FIGURE 11 is pivotally displaced relatively to the position shown in FIGURE 3.

This displacement of the oscillating cam results in the guide bush being moved relatively to the male press die during the forward or working stroke thereof, whereas in the superstructure according to FIGURE 3 the relative movement of the ejector rod 12 is effected only during the return stroke, by the same oscillating cam in the same control device and on the same press.

FIGURES 11, 13, 15 and 17 now show for the guide bush, in a manner similar to that of FIGURES 3, 5, 7 and 9 relatively to the ejector, the positions of the movable parts of the press and of the novel control device, and FIGURES 12, 14, 16 and 18 show, in time-path diagrams, the positions of the press slide and guide bushes at the commencement of a crank rotation to 90°, 180°, 270° and to 360° of the crank rotation.

From the starting position of the press slide, with the crank in the position 0° of rotation, the crank shaft centre begins its rotation in the direction of the arrow 20, until it has reached the position, after 90° of revolution, shown in FIGURE 13. During this quarter revolution, the oscillating cam is, as with the example relating to the ejector, rotated in the anti-clockwise direction. Whilst the roller 17 in FIGURE 11 bears on the oscillating cam 28 at a point having the smallest radius, the roller 17 according to FIGURE 13 bears on a point of the control cam having the largest radius. This means that the rod 38 is displaced by the angle lever 14 and the guide bush 36, preceding the forward stroke of the male press die 37, is moved forward towards the left into the female die.

FIGURE 14 shows the movement of a guide bush in the form of the curve 42 (shown in broken lines) constituting the path-time curve of the guide bush relatively to the time-path curve 43 of the male press die. The distance through which the guide bush is displaced after 90° crank rotation relatively to the male press die is shown in FIGURE 13 as the spacing between the face 44 of the press slide and the end face 45 of the guide bush and, in FIGURE 14, as the vertical spacing (ordinate difference) of the curves 42 and 43 at the abscissa of 90° crank position R°.

A comparison between the two FIGURES 13 and 15 shows for the second quarter of the crank rotation, a rotation back of the oscillating cam 28 into its position according to FIGURE 11, whereby the guide bush is again returned into its starting position and the faces 44 and 45 again bear against each other, as shown at 46 in FIGURE 15, in the same manner as in FIGURE 11.

The further development of the movements of the male press die and control device is characterised by the curve 43 shown in full lines in FIGURES 16 and 17, with which said curve the curve 42 coincides, i.e. between the male press die and the guide bush there is no relative movement until the position 360°, i.e. 0° of rotation of the crank, is attained. The same conclusion can be derived by interpretation of FIGURES 15, 17 and 11 in accordance with the above remarks.

Instead of using the straps 30, 32, the connection between the projection 34 and the pivot of the oscillating cam may be made by means of a toothed rack drive, the rack 50 being rotatably secured for example by means of the pin 33 on the projection 34 and meshing in a gear wheel 51 which rotates about the pivot 29. With this arrangement, the oscillating cam and the gear wheel may be in one piece and may be disposed for free rotation on a pin replacing the pivot 29.

Instead of fixing the pin 33, on which either the strap 32 or the rack is pivotally mounted, permanently at one point on the projection 34, it is possible to provide on the projection a perforated disc in the apertures of which the pin 33 may be inserted and secured. In this way, the adjustability of the control device, in addition to the adjustability of the oscillating cam, may be considerably improved.

As will be clear from the above description, with the novel device described here, the control of the movement of auxiliary elements such as press slide ejectors and press die guide bushes on superstructures driven by a crank can be effected with a wide range of desired movement, time interval and position relative to the movement of the superstructures driven by the crank or relative to the crank movement.

I claim:

1. Means for controlling the movement of an auxiliary element on a device operated by a crank wherein the amount and time duration of each movement of said element are adjustable comprising a first control element having a cam surface pivotably mounted on said device, an actuating element attached to said crank, a connecting member pivotably connected at one point to said actuating element and pivotably connected at another point to said control element, whereby said control element is operated by a movement of said crank, and a second control element pivotably attached to said device is operable by the movement of said cam surface to control the movement of the auxiliary element.

2. Means as claimed in claim 1 wherein a connecting rod is attached to said crank and said actuating element is attached to said connecting rod.

3. Means as claimed in claim 1 wherein said first control element is caused to oscillate about its pivot by the movement of said actuating element.

4. Means as claimed in claim 1 wherein said connecting member comprises two straps pivotably connected together and means whereby during movement of said crank one of said straps does not move relative to said first control element.

5. Means as claimed in claim 1 wherein said connecting member comprises a toothed rack rotatably attached to said actuating element and a gear wheel fixed to said first control element.

References Cited

UNITED STATES PATENTS

| Re. 6,520 | 6/1875 | Payne | 72—344 |
| 1,626,977 | 5/1957 | Sibley | 72—361 |
| 3,053,122 | 9/1962 | Martindell | 72—345 |
| 3,238,761 | 3/1966 | Hoyt | 72—345 |

FOREIGN PATENTS 5,266 11/1920 Netherlands.

RICHARD J. HERBST, *Primary Examiner.*